A. H. MOTLEY, Jr.
MACHINE FOR TRANSFERRING DESIGNS.
APPLICATION FILED OCT. 1, 1910.
1,128,351.
Patented Feb. 16, 1915.
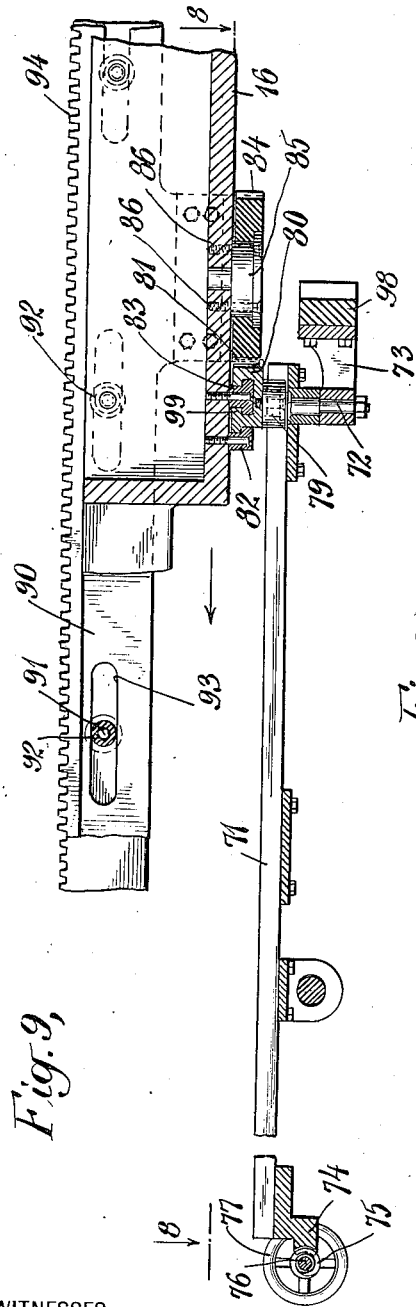
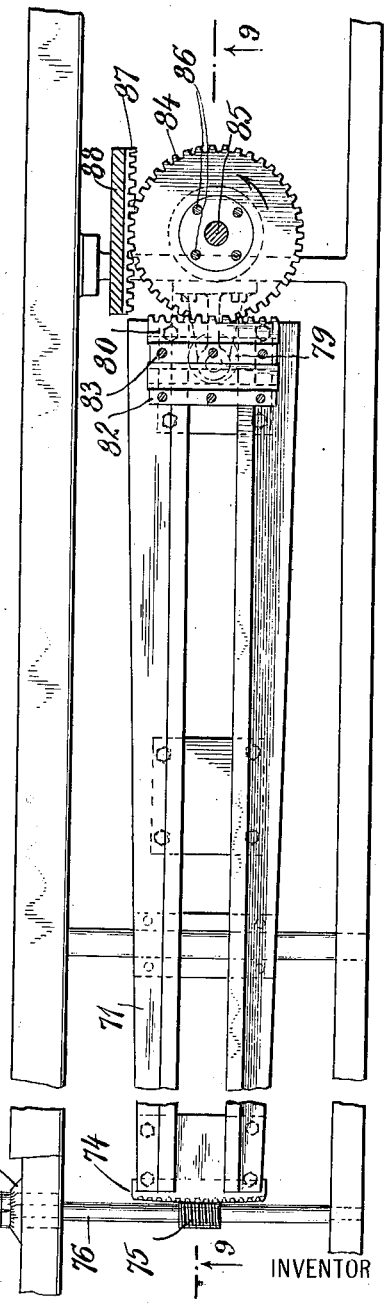
WITNESSES:
INVENTOR
Alfred H. Motley Jr.,
BY
Kenyon & Kenyon
ATTORNEYS A. H. MOTLEY, Jr.
MACHINE FOR TRANSFERRING DESIGNS.
APPLICATION FILED OCT. 1, 1910.
1,128,351.   Patented Feb. 16, 1915.
6 SHEETS—SHEET 6.
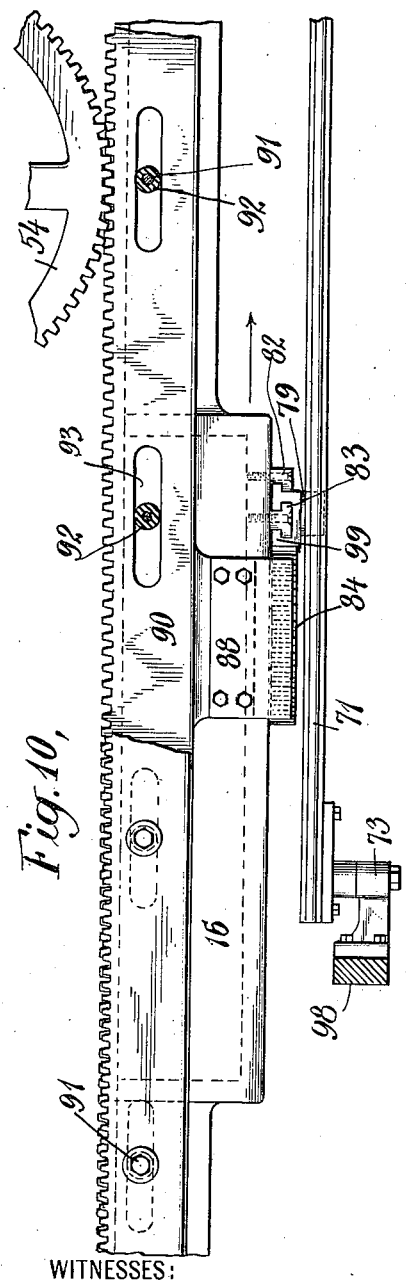
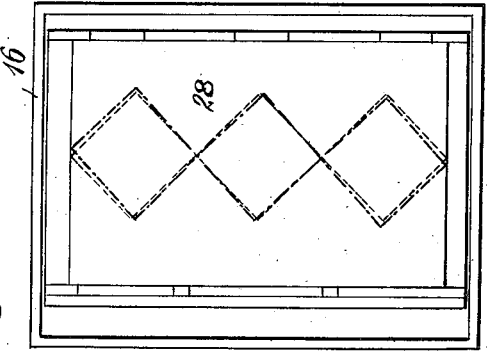
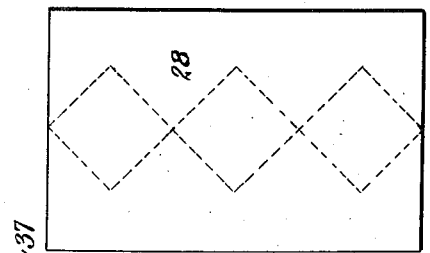
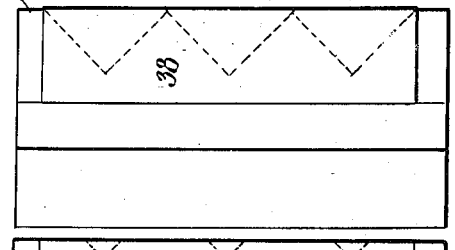
WITNESSES:
INVENTOR
Alfred H. Motley Jr.,
BY
Kenyon & Kenyon
ATTORNEYS

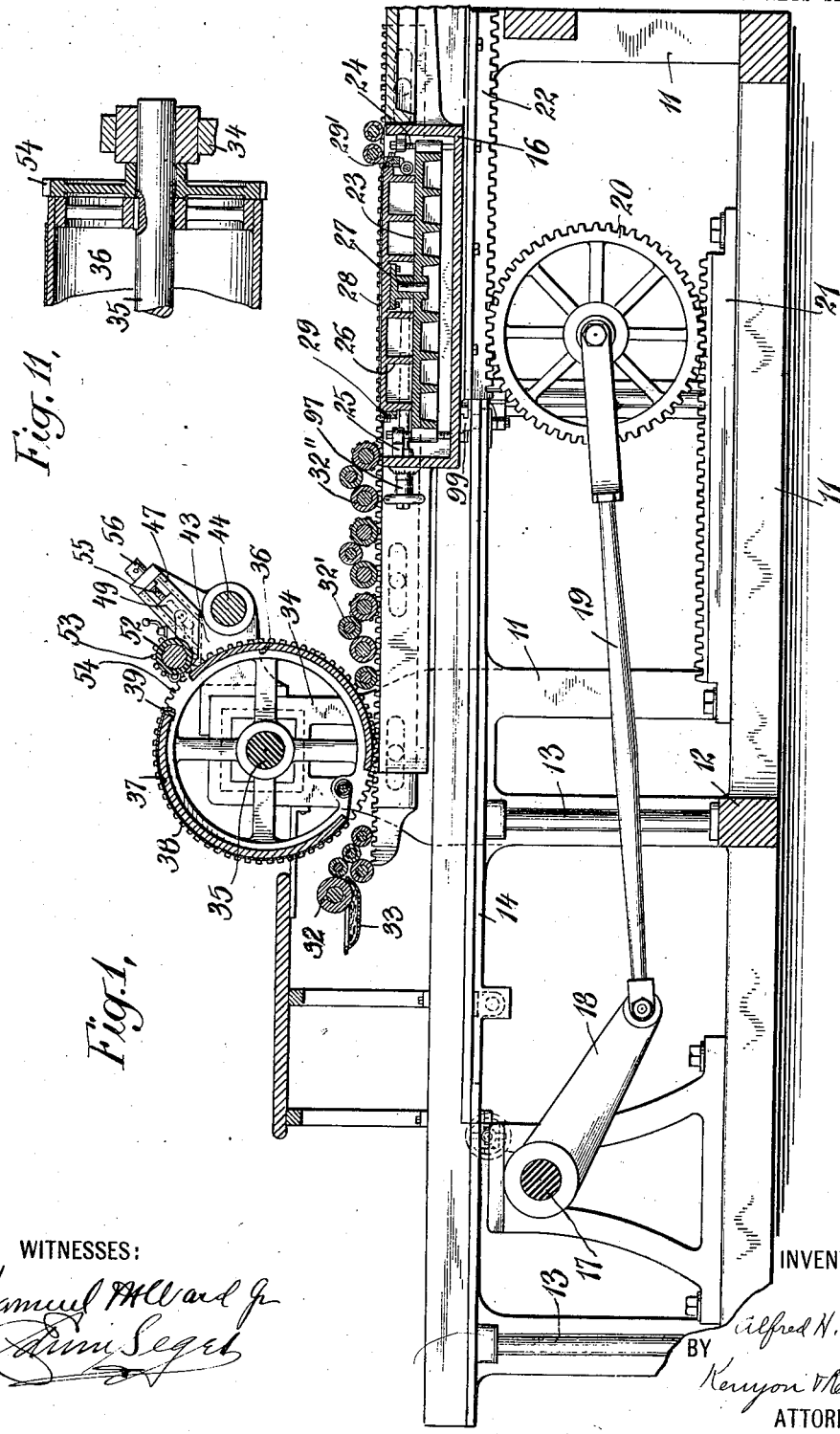

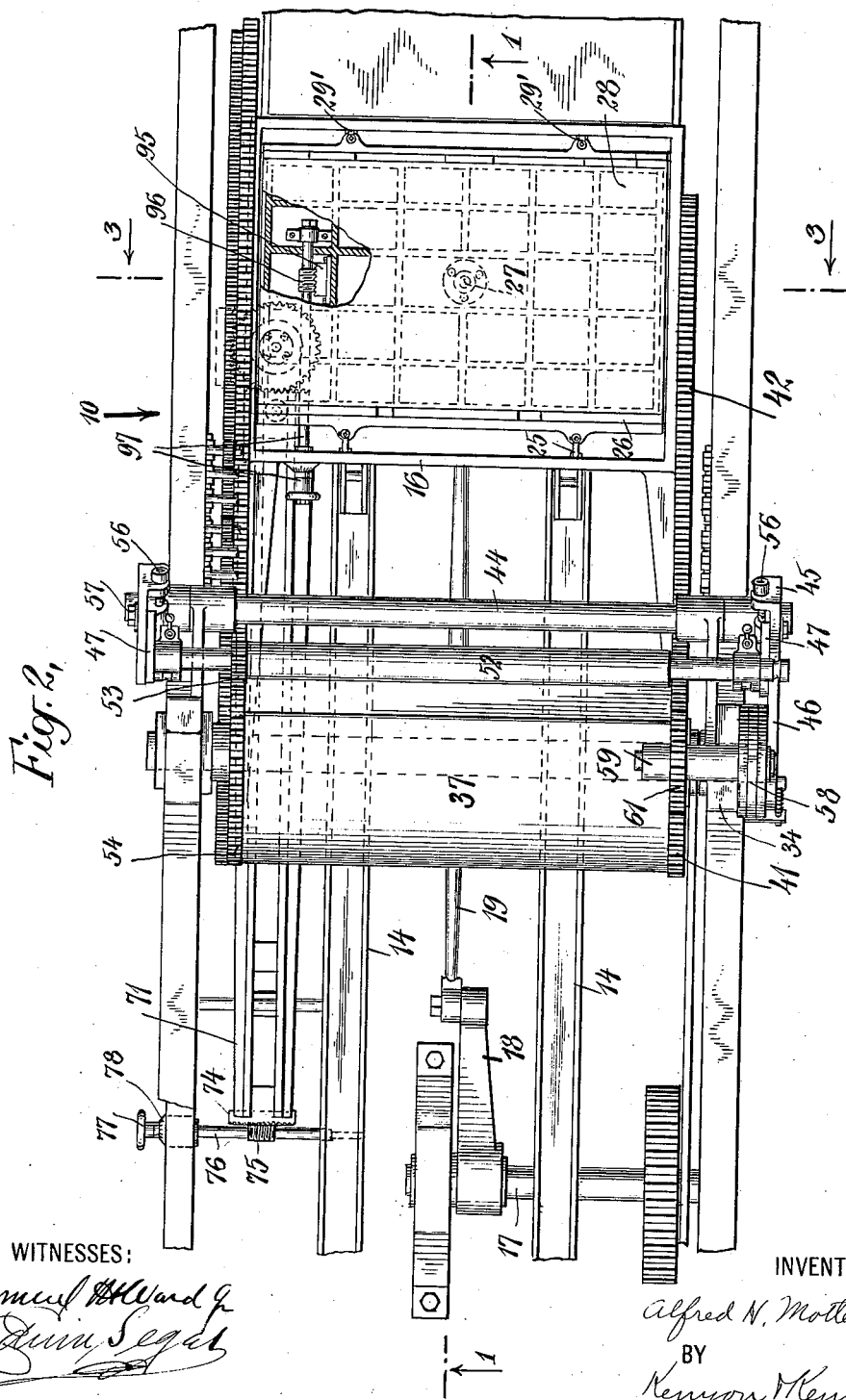

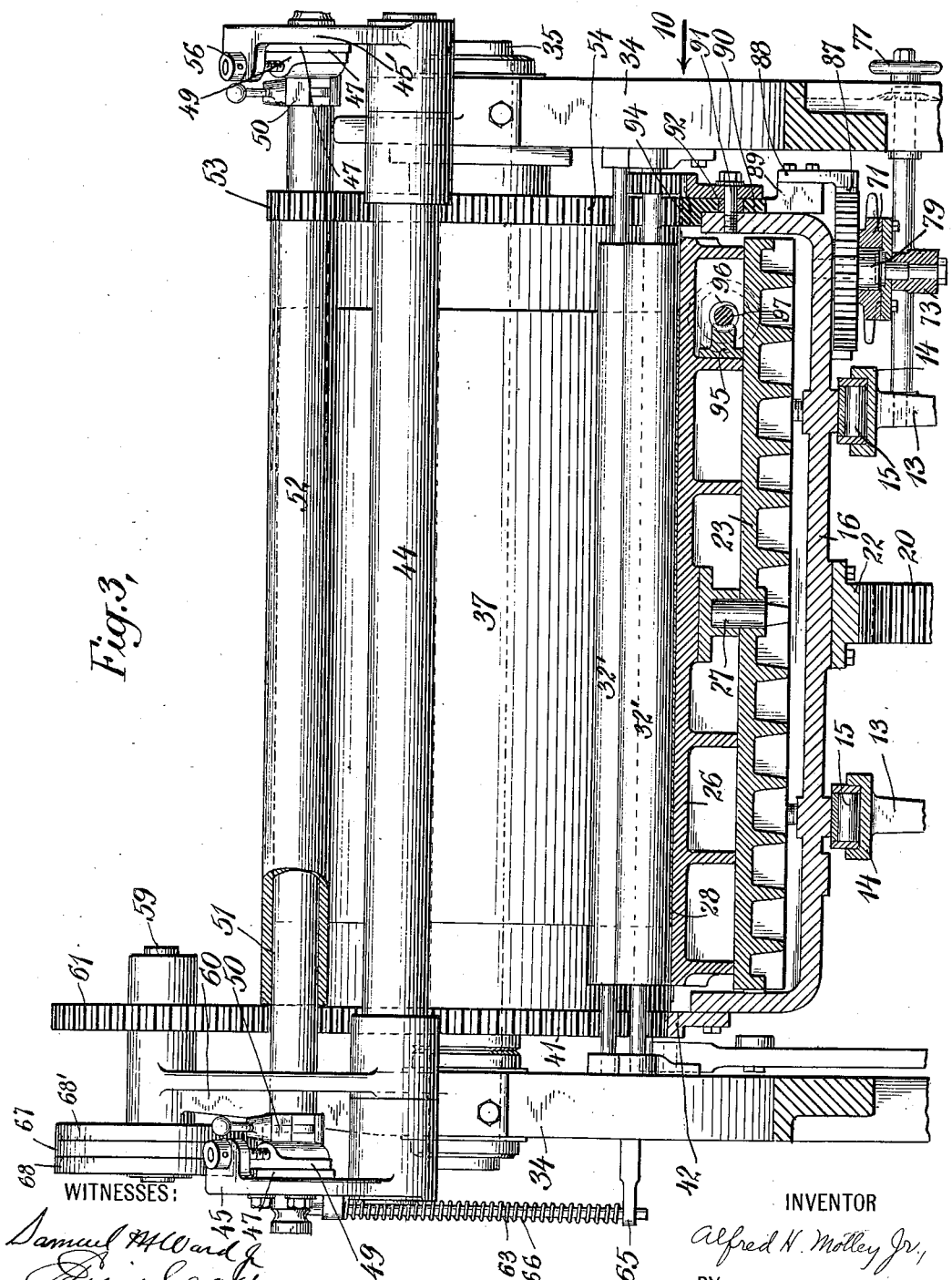

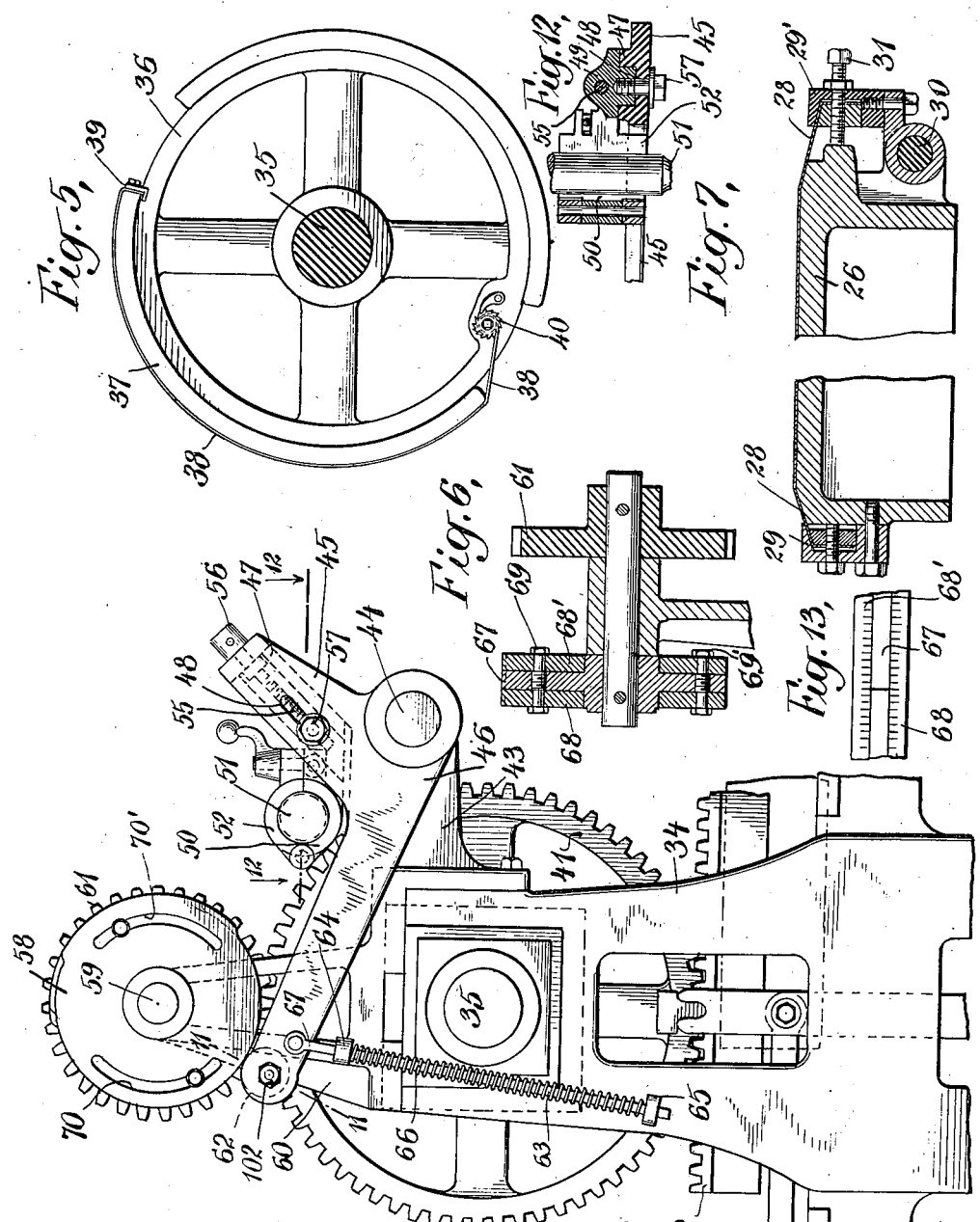

UNITED STATES PATENT OFFICE.

ALFRED H. MOTLEY, JR., OF NEW YORK, N. Y., ASSIGNOR, BY MESNE ASSIGNMENTS, TO LITHOTEX CORPORATION, OF NEW YORK, N. Y., A CORPORATION OF NEW YORK.

MACHINE FOR TRANSFERRING DESIGNS.

1,128,351.  Specification of Letters Patent.  Patented Feb. 16, 1915.

Application filed October 1, 1910. Serial No. 584,813.

*To all whom it may concern:*

Be it known that I, ALFRED H. MOTLEY, Jr., a citizen of the United States, and a resident of New York, in the county and State of New York, have invented certain new and useful Improvements in Machines for Transferring Designs, of which the following is a specification.

My invention relates to machines for transferring designs, and more particularly to machines for transferring designs in cases where the design is to be transferred from one surface to another which it must exactly cover.

The machine is especially adapted for transferring an acid-resist from a suitable printing surface to the surface of a roller that by subsequent etching can be transformed into a printing surface to be used for continuous web printing. Such rollers may be used for printing patterns on textile fabrics, wall paper, silks and the like, or for making impressions on the same by the unevenness of the etched roller surface. The slightest division line or break, even of one or two thousandths of an inch, between complete impressions of the design on the fabric, is visible and spoils the effect of the design; and in order to overcome this difficulty and to make the beginning and end of the successive designs on the fabric completely register with each other, it is necessary in forming the design on the roller, that the ends of the design should exactly meet and register with each other so as to completely cover the roller. It has been found impossible to make a design the exact length of the circumference of the roller on which it is to be transferred, and even if such were possible, it would require the greatest skill and consume a great amount of time in making such designs. Heretofore it has been the usual practice to form designs on printing rollers by hand and this work requires great skill on the part of the operator and consumes a considerable amount of time.

It is the purpose of this invention to provide a machine for transferring designs to printing rollers by which the roller the circumference of which is approximately equal to the length of the design to be transferred, is given a slight backward or forward slipping engagement while being rolled in contact with the design printing surface so as to gradually and uniformly lengthen or shorten the complete design on the roller to effect complete register of the ends of the design upon the roller. The machine provides for bringing the roller into contact with the printing surface at a certain point of the design, and disengaging it from said surface at another determined point in the design. These points mark the beginning and end of the complete pattern whether in a single large unit design or in a plurality of successive small unit designs, and if the design thus transferred to the roller is found to slightly overlap or not quite meet on the roller, then a slight slipping engagement between the surface of the roller and the printing surface is produced in a direction to shorten or lengthen the design on the roller, as the case may be. This slipping engagement being very slight and being distributed throughout the length of the design does not mar or decrease the sharpness of the design to any measurable extent, and the design when transferred to the roller in this manner and examined by a magnifying glass, is found to be extremely clear cut and uniform throughout. By this method, a design can be transferred to a roller and the roller can be etched and ready for printing, the whole operation from the time the printing surface is placed on the machine until the roller is ready for use in printing fabrics, only occupying a very short period of time.

The machine herein described as one embodiment of the invention, is substantial and efficient and may be readily adjusted from time to time for transferring different designs, and insures a perfect and clear cut transfer of the design upon the roller.

The present invention is intended as an improvement on the machine shown and described in U. S. Patent No. 908267 granted to Jacobson & Tooker December 29th, 1908.

One of the objects of the invention is to produce a more durable, substantial and efficient machine for the purpose mentioned.

Another object of the invention is to produce a machine which may be more readily adjusted from time to time for transferring different designs.

Another object of the invention is to insure a more perfect and clear cut transfer of the design, and this object is accomplished in the present form of my invention by rotating the roller to be etched in contact with a reciprocating frame having a suitably curved and preferably yieldable surface such for example as a rubber blanket, on which the acid-resist has been printed, the roller and reciprocating frame being driven so as to produce variable differences in the peripheral velocities of said roller and the engaging surface of the blanket.

Other objects and advantages of the invention will more fully appear from the following description taken in connection with the accompanying drawings illustrating the preferred form of my invention, and in which—

Figure 1 shows a central longitudinal section of a machine illustrating by way of example one embodiment of my invention, said section being taken on line 1—1 of Fig. 2; Fig. 2 shows a plan view of the machine with certain parts broken away; Fig. 3 is an enlarged cross sectional view taken on line 3—3 of Fig. 2, with certain parts broken away; Fig. 4 is a side elevation of the part of the machine shown at the left of Fig. 3 and illustrating the cam movement used in the machine; Fig. 5 is a detail showing the manner of stretching the rubber blanket on its cylindrical frame; Fig. 6 is a sectional view through a cam and part of its gearing shown more fully in Figs. 3 and 4; Fig. 7 is a fragmentary detail showing the manner of stretching over a suitable surface a sheet bearing the design to be transferred on to the rubber blanket; Fig. 8 is a sectional view taken on line 8—8 of Fig. 9 and showing an adjustable pivoted slideway with connecting gearing for varying the peripheral velocity of the roller which receives the design from the rubber blanket; Fig. 9 is a longitudinal section taken on line 9—9 of Fig. 8; Fig. 10 is a side elevation of differential gearing connecting the slideway and the roller as shown in Fig. 3, looking in the direction of the arrow 10, with certain parts broken away; Fig. 11 is a detail of a part of the gearing connecting said roller; Figs. 12, 13 and 14 are details; and Figs. 15 and 16 are diagrams showing the manner of transferring the design onto the roller, and illustrating the necessity of the adjustable features of the machine hereinafter mentioned.

Referring more particularly to Figs. 1, 2 and 3, a main rectangular frame 11 is provided, having lower transverse supporting sills 12 from which extend two sets of uprights 13, one set on each side of the machine, which at their upper ends support two suitable parallel channeled tracks or guideways 14 which are also bolted onto the upper part of frame 11, and in these guideways run rollers 15 on which is mounted a reciprocating platform or carriage 16. This carriage is movable back and forth on the tracks or guideways 14 by means of suitable gearing, and in the present embodiment of the invention this movement is obtained from a suitably journaled power crank shaft 17 on which is mounted a crank 18 which is, in turn, connected by a connecting rod 19 to a gear wheel 20 the teeth of which mesh with a stationary rack 21 suitably secured to the base of the frame, and with a second rack 22 secured to the bottom of the platform or carriage 16; so that as the crank shaft is rotated the gear wheel 20 is rolled back and forth on the stationary rack 21, thus causing the rack 22 and the carriage 16 to which it is attached to move back and forth on the tracks or guideways 14.

Upon the floor of the carriage 16 is mounted a bed plate 23, the height of which from the floor of the carriage is adjusted by means of vertical adjusting screws 24 which pass through suitable threaded eyes 25 on the sides of the carriage. On the bed plate 23 I mount a design-carrying table 26, said table being centrally pivoted upon the bed plate by means of a pivot pin 27, the upper part of said table presenting a smooth surface over which is stretched a suitable metallic sheet 28 (Fig. 7) on which is formed the design to be transferred. Any suitable means may be utilized for stretching the design sheet over the surface of the table 26, and in the present machine I provide suitable clamps 29 and 29' which are mounted on the side of the table 26, the clamps 29' being mounted on a pivot 30 carried by the table, so that by suitably manipulating an adjusting screw 31, the clamps 29' may be moved on their pivots to vary the tension of the transfer sheet 28.

A suitable series of "inking" rollers 32—32'—32", etc., are properly arranged along the path of travel of the carriage 16 so as to engage with and properly "ink" the design sheet mounted on said table. The "ink" or acid-resist for supplying these rollers is carried in a suitable receptacle 33. The arrangement and positioning of said "inking" mechanism, as well as the construction of the main frame of the machine, together with the reciprocating carriage and the gearing for driving the same, form no part of my present invention, the same being of a well known design utilized for many years in printing presses.

Pillow blocks 34 extend vertically from the central portion of each side piece of the main frame, and upon these pillow blocks is journaled a shaft 35 on which is mounted a cylindrical frame 36. This cylindrical frame is provided with a suitable smooth surface 37 over which is stretched a rubber blanket 38 for receiving an impression of the design from the design sheet 28. The rubber blanket may be stretched over the surface 37 by any suitable means, and in the present machine I have shown a clamp 39 for securing one end of the blanket, while a suitable ratchet and pawl mechanism 40 is provided at the other extremity of the blanket for stretching it over the surface 37. A gear wheel 41 is also keyed upon shaft 35 to rotate with the blanket frame 36, and the teeth of this gear mesh with a rack 42 (Figs. 3 and 4) which is rigidly bolted to the reciprocating carriage 16, so that as the carriage moves back and forth, the cylindrical frame 36 is also reciprocated by means of said rack and gear to rotate the blanket into engagement with the design sheet 28 as it passes beneath the cylindrical frame 36, and at a peripheral velocity equal to the velocity of the design sheet. In this manner, the design upon the sheet 28 is transferred to the blanket 38 in the form of an acid-resist. The resiliency of the blanket, by overcoming any slight depressions in the design sheet or inequalities in the "inking" or in the etching of said sheet, insures a more perfect transfer of the design.

At the upper end of the pedestals 34 are bolted horizontal arms or brackets 43 in the outer extremities of which is journaled a shaft 44 (Figs. 4 and 12), and rigidly secured to one end of this shaft is a bell crank lever having arms 45, 46, while on the opposite end of said shaft 44 there is rigidly secured an arm 45' similar in all respects to the arm 45 of the bell crank lever. The inner faces of these arms 45, 45' are provided with channels or guideways 47, the bottom of said channels being partly slotted out, as shown at 48, and in these channels are adjustably mounted guide blocks 49, being extensions of the lower half of split journal blocks 50 in which are journaled a mandrel 51, and on this mandrel is secured a copper or other suitable metal roller or sleeve 52 which is to receive the design from said rubber blanket. On one end of this mandrel is rigidly secured a pinion 53 which meshes with an idler 54 loosely mounted on the shaft 35 at the opposite end from gear 41 (Fig. 3).

In order to utilize different sized rollers for receiving the design from the rubber blanket, it is necessary to use pinions of different diameters on the mandrel, since it is necessary that the ratio of the diameter of the roller to the pinion used therewith should remain constant in order that the peripheral velocity of the roller and the rubber blanket will be approximately equal regardless of the size of the roller used; and in order to permit the use of different sized pinions on the mandrel, it is necessary to provide some means of raising and lowering the journal blocks 50 with respect to the gear 54. This I accomplish in the present embodiment of my invention by means of bolts 55 having enlarged heads 56, the bolts being threaded into the guide blocks 49 forming a part of said journal blocks. By turning the bolts 55 in the proper direction, the guide blocks 49 and journal blocks 50 will be raised or lowered in the guideways 47 so as to accommodate different size pinions on the mandrel 51. When the journal blocks have thus been adjusted so that the pinion to be used properly meshes with the gear wheel 54, the journal blocks may be firmly clamped in position by means of clamping screws 57 which extend through the slots 48 in the bottom of the guideways 47 and are threaded into the guide blocks 49.

In order to lower and raise the copper roller 52 into and out of engagement with the rubber blanket, I provide the following apparatus: A suitable cam 58 is keyed to a shaft 59 mounted on a pedestal 60 supported on top of one of the pillow blocks 34, the pedestal 60 and the adjacent horizontal arm 43 forming an integral casting. Also keyed to the shaft 59 is a gear 61 which meshes with gear 41 on shaft 35, so that the peripheral velocity of the cam 58 relative to the rubber blanket is fixed; and in the present machine, their peripheral velocities are the same.

Engaging the periphery of the cam 58 there is a roller 62 which is carried at the extremity of the bell crank lever arm 46, to which arm is pivoted a rod 63 extending through an eye 65 on the pillow block 34, said rod being provided at its upper end with a fixed collar 64, which collar receives the thrust of a spring 66, thus forcing arm 46 upward and holding the roller 62 in engagement with the periphery of the cam. This upward movement of arm 46 of the bell crank lever is sufficient to raise the copper cylinder 52 out of contact with the rubber blanket when the roller is engaging certain portions of the cam surface; but when the roller is in engagement with other portions of the cam surface, the bell crank lever is forced down into position to throw the copper roller back into engagement with the rubber blanket. This rocking movement of the bell crank lever, while sufficient to disengage the copper cylinder from the blanket, is not great enough to disengage the pinion 53 from gear wheel 54.

In order that the design when printed from the copper roller, will appear uniform, i. e., consisting of repetitions of complete elements of the design, without any break between the commencement and ending of the complete design, it is necessary that the distance between the commencement and ending of the complete design should be as near as possible equal to the circumference of the copper roller and also that the roller be let down into engagement with the design at a certain point in an element of the design, and lifted from the blanket at a corresponding point in the same or another element of the design. In practice, it is preferable to work from centers of elements of the design, that is, to let the roller into engagement with the blanket at the center of an element and raise it at the center of a succeeding element. In order to accomplish this purpose, I have constructed the cam 58 with three plates (Figs. 6 and 13), a central fixed plate 67 and two side adjustable plates 68, 68', which are secured to the central plate 67 by bolts 69, 69' which pass through slots 70, 70' in the plates 68, 68', and are threaded into the fixed plate 67. Each plate has a portion of its circumference raised a sufficient height so that when the roller 62 is in engagement with that portion, the roller will be forced into engagement with the rubber blanket, and the different plates may be so adjusted with respect to each other that there will be a continuous raised portion of the circumference of the cam which will be such as to hold the roller in contact with the blanket until it has made a complete revolution. Furthermore, the two side plates may be so adjusted with respect to the center plate as to lower and permit the lifting of the copper cylinder at any desired points on the rubber blanket. To accomplish this, each of the said side plates is graduated from a center line marked on the fixed plate, so that the lowering and lifting of the roller at exactly corresponding points in the design on the rubber blanket, may be accurately determined and adjusted; and after this adjustment is secured, the side plates of the cam may be securely clamped to the fixed plate by means of the locking bolts 69, 69'.

To render the cam and roller inoperative to move the copper roller into engagement with the rubber blanket at such times as it is desired to adjust other parts of the machine, I mount the roller 62 on a stud 100 (Fig. 14) which has an enlarged eccentric head 101 mounted in a recess in the arm 46 of the bell crank lever. A bolt 102 extends through the lever arm 46 into the center of this head, so that by turning the bolt with a wrench or other suitable tool, the eccentric head will be moved into a position to throw the roller away from the cam.

It has been found in practice to be impossible to form the design exactly equal to the circumference of the roller, and it is impossible to turn the roller down to the length of the design, and even if this could be done, it would result in considerable waste of copper or other metal of which the cylinder is made, each time the roller had a new design transferred to it. A difference of only a few thousandths of an inch between the length of the design and the circumference of the roller will produce visible lines of division between parts of the design when printed in continuous web from said copper roller; and this division, even if it amounts to a mere hair line, will show in the design when transferred, so that it is not only necessary to lower and lift the roller at corresponding points in the design on the rubber blanket, but it is also necessary to provide means for causing the two ends of the design as transferred to the roller to just exactly meet in order to completely close the design up without even a hair line of division between the commencement and ending of the design on the roller, so that no lines of division will appear in continuous web printing from the roller. To accomplish this purpose, it is necessary to give to the roller a peripheral velocity slightly greater or less than the peripheral volocity of the rubber blanket with which it is in contact, depending upon whether or not the design, as first transferred onto the roller, is found to have a gap between the ends thereof or to overlap. In other words, it is necessary to produce a slight forward or backward slip between the surfaces of the roller and rubber blanket in order to slightly drag out or shorten the design on the roller. This is accomplished by differential gearing connecting the frame of the rubber blanket with the roller; and by way of illustration, I have shown the following gearing for accomplishing this purpose.

Mounted below the path of travel of the carriage 16 and between one of the slideways 14 and one side of the main frame, there is provided a slideway 71 (Figs. 8, 9 and 10) which is pivoted at one end, by means of a pin 72, to a bracket 73 bolted to a cross piece 98 of the main supporting frame of the machine. The slideway has secured to its other end a fine worm rack 74 which meshes with a worm wheel 75 mounted on a shaft 76 which is journaled at its outer end in one of the side pieces of the main frame and provided with a handle 77 on the sleeve of which there is an index pointer moving over a graduated scale 78, the object of which is to measure the distance which the slideway 71 has been swung on its pivot from its normal position, which is parallel with the direction of travel of the carriage 16. A slide block or roller 79 is arranged to move back and forth in the slideway 71, and this roller is rigidly secured to a casting 80 on one edge of which is formed a short rack 81, said casting being supported from the floor of the carriage 16 by supporting guide rails 82—83 forming slideways in which suitable tongues 99 from the casting 80 engage to permit the casting to slide laterally. This rack meshes with a gear 84 which is journaled on the head of a stud 85 rigidly secured to the floor of the carriage 16 by means of bolts 86. The gear 84 in turn meshes with a short rack 87 having a vertical flange 88 by which it is rigidly secured to the lower edge 89 of a rack bar 90 supported from the carriage 16 by means of bolts 91 which pass through rollers 92 mounted in longitudinal slots 93 formed in the rack bar, said bolts being screwed into the carriage 16. This rack bar 90 is provided with teeth 94 on its upper edge which, in turn, mesh with the idler 54 mounted on shaft 35, and through which the rack bar drives the copper roller.

The operation of this gearing is as follows: If it is found that the ends of the design when transferred to the roller, do not quite meet, then by rotating the shaft 76 in a direction to throw the pivoted slideway 71 away from the handle of the shaft, the roller, in traveling down the slideway as the carriage moves forward, will be forced laterally in the direction in which the slideway was swung, thus causing the rack 80 to move laterally in the same direction, rotating the gear wheel 84 in the direction of the arrow in Fig. 8, thus advancing the racks 87 and 90 on the carriage, giving them a slightly increased speed over the carriage, the result of which is to drive the roller 52 at a slightly greater peripheral velocity than the rubber blanket is being driven at, thus causing the roller to slightly slip ahead on the rubber blanket during its entire revolution. Since the difference in the peripheral speeds of the two surfaces is extremely slight, being just sufficient to close up or open the very small gap or overlap, and being distributed throughout the whole revolution of the roller, the effect of this slipping does not in any way lessen the clear outlines in the design. If it is found on trial that the ends of the design slightly overlap on the roller, it is only necessary to turn the handle 77 in the opposite direction, to throw the slideway 71 toward the handle, the result of which will be that the rack 90 will have a slightly reduced speed, thus causing the roller to rotate at a slightly less peripheral velocity to make the overlapping edges exactly meet.

The effect of using a roller the circumference of which is slightly greater than the distance between predetermined corresponding points of the design, is shown in Fig. 15, in which the ends of the design are shown on the roller as not quite meeting. This defect is taken care of as above explained. A second difficulty in transferring designs to the roller is illustrated by the dark lines in Fig. 16, in which it will be seen that after the design is transferred from the design sheet to the roller, the corresponding points in the ends of the design are found to mis-match laterally. This is due to the fact that the design sheet 28 has not been properly alined parallel to the direction of travel of the carriage 16; and to obviate this difficulty, I have provided the pivoted bed plate 26 with a short length of worm rack 95 (Figs. 1 and 2), which is fastened securely to one side thereof, and meshing with this rack there is a worm 96 mounted on a shaft 97 which is secured at one end to the pivoted table, its other end being journaled in the traveling carriage. This shaft, like shaft 76, is also provided with an operating handle having an index pointer which moves over a graduated scale secured to the carriage. By means of this worm gearing and graduated scale, the table may be rotated on its pivot in one direction or the other, the exact amount that the ends of the design are found to be mis-matched laterally.

By transferring the design from the design sheet as stretched over any suitable surface, onto the cylindrical rubber blanket, I obtain a perfect and clear cut design, regardless of slight irregularities in the surface of the design sheet or slight inequalities in the "inking" thereof, since the rubber blanket is resilient and has a greater affinity than metal for the "ink" or acid-resist with which the design sheet is covered; and by transferring the design to the roller from the cylinder surface of the blanket, I am enabled to overcome slight inequalities in the surface of the roller, and to obtain a clear cut outline, due to the fact that the contact is between two cylindrical surfaces.

Whenever in the specification or in the claims I have referred to the roller as a roller to be used for printing, I wish to be understood as not limiting the invention to one in which the roller must be used by inking the same to transfer the design therefrom onto cloth, paper, etc., for obviously the roller, as stated in the specification, in so far as my invention is concerned, may be used after being etched for printing by imprint or impression caused only by the unevenness of the etched surface. Furthermore, where in the specification and claims I have used such language as "a surface adapted to receive" or "a surface for receiving a design" or an acid-resist of a design to be transferred, I wish to be understood, unless expressly otherwise limiting the language, to mean a surface upon which the design may be directly impressed or printed, or a surface upon which a thin metal plate bearing the design may be laid or stretched, since it is obvious that in so far as certain broad aspects of my invention are concerned, it is immaterial in what manner the surface in question receives the design.

While I have shown and described what I believe to be the best form of my invention now known to me, it is obvious to those skilled in the art that various substitutions and modifications may be made therein, such, for instance, as changing the form of the cam mechanism, the differential gearing and the general arrangement of the surfaces for transferring and receiving the design; and while I have shown and described my invention with particularlity in its present embodiment, this is merely by way of example, and I do not wish to be understood as limiting myself to any specific features of construction or arrangement other than as indicated in the appended claims.

What I claim as new and desire to secure by Letters Patent, is:

1. In a machine for transferring designs from a surface to a roller to be used for printing, the combination of a surface having a design to be transferred, a curved surface operatively related thereto and receiving the design from said first surface, means for moving one of said surfaces into engagement with the other, whereby said design is transferred from one to the other, a roller operatively related with respect to said curved surface to rotatively engage therewith and receive the design therefrom, and means producing a slight slipping engagement between the two curved surfaces.

2. In a machine for transferring designs from a surface to a roller to be used for printing, the combination of a surface having a design to be transferred, a cylindrical surface operatively related thereto to receive the design from said first surface, means for moving one of said surfaces into engagement with the other whereby said design is transferred from one surface to the other, a roller operatively related with respect to said cylindrical surface to rotatively engage therewith and receive the design therefrom, and means including differential gearing connecting said roller with one of said surfaces, and producing slight forward or backward slipping engagement between the roller and the cylindrical surface.

3. In a machine for transferring designs from a surface to a roller to be used for printing, the combination of a surface having a design to be transferred, a curved surface operatively positioned with respect to said first surface to receive the design therefrom, means for reciprocating said surfaces, a roller mounted adjacent said curved surface to rotatively engage the same, and means for driving said roller while in engagement with said curved surface, at a different peripheral velocity therefrom.

4. In a machine for transferring designs from a surface to a roller to be used for printing, the combination of a frame having a surface on which is mounted a design to be transferred, a cylindrical surface operatively arranged with respect to the first surface and carrying a blanket to engage therewith and receive the design therefrom, means for giving reciprocating movement to said blanket and design-carrying surface whereby the design is transferred from one to the other, a roller operatively related with respect to said blanket to rotate in contact therewith and receive the design therefrom, means for varying the peripheral velocity of said roller from that of the surface of the blanket with which it is in contact, and means for effecting engagement and disengagement of the roller and blanket at corresponding points in the design.

5. In a machine for transferring designs from a surface to a roller to be used for printing, the combination of a surface having a design to be transferred, a cylindrical surface operatively related thereto to receive the design from said first surface, means for moving one of said surfaces back and forth into engagement with the other, a roller rotatively engaging said cylindrical surface and receiving the design therefrom, a rack moving back and forth with said moving surface but at a different speed therefrom, said rack being geared to the roller to drive the same while it is in engagement with said first cylindrical surface, whereby more or less forward or backward slip is produced between said cylindrical surface and roller.

6. In a machine for transferring designs from a surface to a roller to be used for printing, the combination of a surface for receiving the design to be transferred, a roller operatively related to said surface to receive the design therefrom, means for positively moving the design bearing surface, and means for rotating the roller along said surface, one of said means including differential gearing for producing slipping engagement between the roller and said surface while the design is being transferred, means for varying the differential action of said gearing, and means for effecting engagement and disengagement of the roller and said design-bearing surface at predetermined points in the design, whereby the design as transferred on the roller will be lengthened or shortened so that the ends of the design will exactly meet on the roller.

7. In a machine for transferring designs from a surface to a roller to be used for printing, the combination of a surface for receiving the design to be transferred, a roller operatively related to said surface to receive the design therefrom, means for positively moving the design-bearing surface, and means for rotating the roller along said surface, one of said means including differential gearing for producing slipping engagement between the roller and said surface while the design is being transferred, means for varying the differential action of said gearing, and means including a rotating cam and connections between the same and the roller for effecting engagement and disengagement of the roller and said design-bearing surface at predetermined points in the design, whereby the design as transferred on the roller will be lengthened or shortened so that the ends of the design will exactly meet on the roller.

8. In a machine for transferring designs from a surface to a roller to be used for printing, the combination of a yieldable surface for receiving an acid-resist of the design to be transferred, a roller operatively related to said surface to receive the design therefrom, means for positively moving the design-bearing surface, means for rotating the roller along the design-bearing surface, one of said means including differential gearing for producing predetermined forward or backward slipping engagement between the surfaces while the design is being transferred, and means for effecting engagement and disengagement of the roller with said design surface at corresponding points in the design, whereby the ends of the design are caused to exactly meet and completely cover the roller.

9. In a machine for transferring designs from a surface to a roller to be used for printing, the combination of a yieldable surface for receiving an acid-resist of the design to be transferred, a roller operatively related to said surface to receive the design therefrom, means for positively moving the design-bearing surface, means for rotating the roller along the design-bearing surface, one of said means including differential gearing for producing predetermined forward or backward slipping engagement between the surfaces while the design is being transferred, and means including a rotating cam comprising a plurality of adjustable plates and a lever operatively related to the same and to the roller for effecting engagement and disengagement of the roller with said surface at corresponding points in the design, whereby the ends of the design are caused to exactly meet and completely cover the roller.

10. In a machine for transferring designs from a surface to a roller to be used for printing, the combination of a surface carrying a design to be transferred, a cylindrical surface operatively related thereto to receive an acid-resist of the design from said first surface, means for moving one of said surfaces back and forth into engagement with the other, a roller rotatively engaging said cylindrical surface to receive the design therefrom, means for producing a slight predetermined forward or backward slipping engagement between the roller and its engaging surface, whereby the design as transferred to the roller is lengthened or shortened thereon to cause its ends to exactly meet, and a cam for effecting engagement and disengagement between the roller and its engaging surface.

11. In a machine for transferring designs from a surface to a roller to be used for printing, the combination of a reciprocating frame and a surface carried by said frame for receiving a design to be transferred, a cylindrical surface operatively related thereto to receive therefrom an acid-resist of said design, a roller rotatively mounted adjacent said cylindrical surface to engage therewith and receive the design, means for reciprocating the frame carrying the primary design surface, gearing connecting said reciprocating frame and said cylindrical surface, through which gearing the cylindrical surface is also reciprocated, and gearing between said reciprocating frame and said roller, one of said sets of gearing comprising a differential device whereby said roller is caused to rotate at a slight predetermined different relative velocity with respect to the engaged surface and while in engagement therewith.

12. In a machine for transferring designs from a surface to a roller to be used for printing, the combination of a frame having a surface bearing a design to be printed, a roller adapted to engage said surface and be rotated on the same so as to receive an imprint of the design therefrom, means for rotating said roller on said surface so as to produce a slight predetermined slipping engagement between the two to cause the ends of the design to exactly meet on the roller, said means including a differential device comprising two members, one a pivoted slideway and the other a relatively movable slide block thereon, one of said members being laterally adjustable, and gearing connecting the other member to the roller, and means for effecting engagement and disengagement of said roller and design surface at certain points in the design.

13. In a machine for transferring designs from a surface to a roller to be used for printing, the combination of a frame having a surface bearing a design to be printed, a roller adapted to engage said surface and be rotated on the same so as to receive an imprint of the design therefrom, means for rotating said roller on said surface so as to produce a slight predetermined slipping engagement between the two to cause the ends of the design to exactly meet on the roller, said means comprising a laterally adjustable pivoted slideway, a slide block moving thereon and gearing connecting said block and roller, and means including a cam for effecting engagement and disengagement of said roller and surface.

14. In a machine for transferring designs from a surface to a roller to be used for printing, the combination of a frame having a surface bearing the design to be printed, a roller adapted to engage said surface and to be rotated thereon so as to receive an imprint of the design therefrom, means for rotating said roller on said surface so as to produce a slight predetermined sliding engagement between the two to cause the ends of the design to exactly meet on the roller, said means comprising a pivoted adjustable slideway, means for adjusting the slideway laterally to either side of its normal position, a reciprocating carriage movable forward and backward longitudinally of the slideway, a slide block supported by the carriage and movable transversely thereof and back and forth on the slideway as the carriage is moved, a rack secured to said slide block and moved therewith transversely of the carriage, a gear wheel also supported by the carriage and geared with said rack, a second rack supported on the carriage and geared with said gear wheel and roller and driven by said wheel longitudinally of the carriage as the latter moves back and forth, and gearing connecting the carriage and frame to reciprocate the latter when the carriage moves back and forth, and means including a cam for effecting engagement and disengagement of the roller and design surface at certain points in the design.

15. In a machine for transferring designs from a surface to a roller to be used for printing, the combination of a reciprocating frame, a design to be transferred carried by said frame, a cylindrical frame having a blanket stretched thereon and operatively related to the first frame to receive the design on said blanket, means for reciprocating said frames to move the blanket and design into engagement with each other, a roller operatively related to the second frame to receive the design from said blanket, a rack moving back and forth with one of said frames but having a predetermined relative movement with respect thereto, and means connecting said rack and roller whereby more or less predetermined forward or backward slip is produced between said blanket and roller while in engagement one with the other.

16. In a machine for transferring designs from a surface to a roller to be used for printing, the combination of a reciprocating frame, a design to be transferred carried by said frame, a cylindrical frame having a surface operatively related to the first frame to receive the design thereon, means for reciprocating said frames to move said surface and design into engagement with each other, a roller operatively related to the second frame to receive the design from its surface, a rack moving back and forth with one of said frames but having a predetermined relative movement with respect thereto, means including a pivoted slideway and a relatively movable slide block thereon, one of which is laterally adjustable and the other connected to the frame with which the rack moves and geared to the rack, for moving said rack back and forth on said last frame, and means connecting said rack with the roller whereby more or less predetermined forward or backward slip is produced between the surface of the cylindrical frame and the said roller while in engagement one with the other.

17. In a machine for transferring designs from a surface to a roller to be used for printing, the combination of a reciprocating frame having a design surface thereon, a cylindrical frame having a rubber blanket stretched thereon and operatively related to the design surface to receive an imprint of said design, means for reciprocating said first frame to move the design surface into engagement with the blanket, gearing connecting said first and second frames including a rack carried by the first frame, a roller operatively related to said cylindrical frame to receive the design from said blanket, a second rack connected with the first frame to move back and forth therewith, means including an adjustable pivoted member having connections with said second rack to produce predetermined relative movement between said second rack and first frame, and gearing connecting said second rack with the roller whereby the blanket and the surface of the roller are driven at different peripheral velocities while in contact one with the other.

18. In a machine for transferring designs from a surface to a roller to be used for printing, the combination of a reciprocating frame having a design surface thereon, a cylindrical frame having a rubber blanket stretched thereon and operatively related to the design surface to receive an imprint of said design, means for reciprocating said first frame to move the design surface into engagement with the blanket, gearing connecting said first and second frames including a rack carried by the first frame, a roller operatively related to said cylindrical frame to receive the design from said blanket, a second rack connected with the first frame and geared to the roller, and means including differential gearing comprising an adjustable pivoted member connected with one of said racks so as to produce relative movement between them, whereby the blanket and surface of the roller are driven at different peripheral velocities while in contact one with the other.

19. In a machine for transferring designs from a surface to a roller to be used for printing, the combination of a surface carrying a design to be transferred, a cylindrical surface operatively related thereto to receive the design from said first surface, means for moving one of said surfaces back and forth into engagement with the other, a roller rotatively engaging said cylindrical surface to receive the design therefrom, means for producing a slight predetermined forward or backward slip between the roller and its engaging surface so as to cause the design to meet on the roller, and means including a cam for engaging and disengaging said roller and cylindrical surface.

20. In a machine for transferring designs from a surface to a roller to be used for printing, the combination of a reciprocating frame, a surface carried by said frame and having a design to be transferred, a cylindrical surface having a blanket thereon and operatively related with respect to said first surface to receive therefrom the design on said blanket, a roller rotatively mounted adjacent said cylindrical surface to engage with and receive the design from said blanket, means for reciprocating the frame carrying said design surface, gearing connecting said reciprocating frame and said cylindrical surface through which said cylindrical surface is also reciprocated, gearing between said reciprocating frame and said roller whereby said roller may be rotated at a predetermined different relative velocity with respect to said blanket while in engagement therewith, and means including a cam for lowering and lifting said second cylindrical surface into and out of engagement with said blanket.

21. In a machine for transferring designs from a surface to a roller to be used for printing, the combination of a frame having a surface bearing a design to be printed, a roller adapted to engage said surface and be rotated on the same so as to receive an imprint of the design therefrom, and means for rotating said roller on said surface so as to produce a slight predetermined slipping engagement between the two to cause the ends of the design to exactly meet on the roller, said means including a differential device comprising two members, one a pivoted slideway and the other a relatively movable slide block thereon, one of said members being laterally adjustable and the other member being adapted to travel with respect to, and in sliding engagement with, the adjustable member during the rotation of the roller on the design-bearing surface, and gearing connecting the traveling member to the roller.

22. In a machine for transferring designs from a surface to a roller to be used for printing, the combination of a reciprocating frame having a cylindrical surface adapted to receive a design to be printed, gearing for positively reciprocating said frame, a roller operatively related to said surface so as to engage therewith and receive an imprint of the design therefrom, gearing for positively rotating the roller while in engagement with said surface, a pivoted lever on which said roller is journaled, means including a rotatable cam acting on the lever to effect engagement and disengagement of the roller with the surface, said cam consisting of a plurality of adjustable plates, and gearing for positively rotating the cam.

23. In a machine for transferring designs from a surface to a roller to be used for printing, the combination of a reciprocating frame having a cylindrical surface adapted to receive a design to be printed, gearing for positively reciprocating said frame, a roller operatively related to said surface so as to engage therewith and receive an imprint of the design therefrom, gearing for positively rotating the roller while in engagement with said surface, a pivoted bell-crank lever on one arm of which said roller is journaled, a rotatable cam engaging the other arm of said lever to move the roller into engagement with the surface, said cam consisting of a plurality of adjustable plates with graduations on at least one of said plates, a spring for thrusting the last mentioned arm of the bell-crank into engagement with said cam, and means for positively rotating said cam.

24. In a machine for transferring designs from a surface to a roller to be used for printing, the combination of a reciprocating frame having a cylindrical surface adapted to receive a design to be printed, gearing for positively reciprocating said frame, a roller operatively related to said surface so as to engage therewith and receive an imprint of the design therefrom, gearing for positively rotating the roller while in engagement with said surface, a pivoted lever on which said roller is journaled, an eccentric engaging member mounted on said lever, means including a rotatable cam engaging said member to move the lever to effect engagement and disengagement of the roller with the surface, and gearing for positively rotating the cam.

25. In a machine for transferring designs from a surface to a roller to be used for printing, the combination of a frame having a yieldable cylindrical surface adapted to receive a design to be transferred, a roller adapted to engage said surface and be rotated on the same so as to receive an imprint of the design therefrom, means for reciprocating said surface, and means for rotating said roller on said surface so as to produce a slight predetermined slipping engagement between the two to cause the ends of the design to exactly meet on the roller, said means including a differential device comprising two members, one a pivoted slideway and the other a relatively movable slide block thereon, one of said members being laterally adjustable, and gearing connecting the other member to the roller.

26. In combination, a metal roller, a blanket roller, and means to transfer a design from the blanket roller to the metal roller by the rotation of both rollers, the said means including differential gearing to cause variable peripheral velocities between the two rollers.

In testimony whereof, I have signed my name to this specification, in the presence of two subscribing witnesses.

ALFRED H. MOTLEY, Jr.

Witnesses:
SAMUEL M. WARD, Jr.,
EDWIN SEGER.